Patented Oct. 9, 1923.

1,470,407

UNITED STATES PATENT OFFICE.

CHARLES P. WATSON, OF NEW YORK, N. Y.

METHOD AND MOVING-PICTURE FILM FOR ANALYZING MOTION.

No Drawing.   Application filed May 13, 1920.   Serial No. 380,970.

*To all whom it may concern:*

Be it known that I, CHARLES P. WATSON, citizen of the United States, and a resident of city of New York, in the county of New York and State of New York, have invented certain new and useful Improvements in Methods and Moving-Picture Films for Analyzing Motion, of which the following is a specification.

My invention relates to a new method and moving picture film for analyzing motion. According to my invention I take consecutive pictures of the object or part, movement of which is to be analyzed, on a moving picture film at a high rate of speed and then after developing the same and preferably making a corresponding positive film, project the pictures at a relatively low rate of speed, say about 16 per second, whereby the motion or movement of the object or parts depicted may be easily analyzed. It is well understood that in the projection of motion pictures, the consecutive pictures must be projected at a rate at least substantially as great as 16 per second in order that the eye may perceive the result as a substantially continuous picture. It has, I believe, been heretofore impossible to obtain satisfactory analysis of motion in the general manner contemplated because the relatively great speed with which the pictures must be taken in order to secure proper analysis of motion of most subjects, was not appreciated. And furthermore I found that when the ordinary moving picture film was exposed at a relatively high rate in the ordinary moving picture camera, there was produced a blurring or the like of the pictures when projected thus causing the results to be wholly unsatisfactory, especially when it was attempted to take the pictures on a film intermittently driven and during the periods at which the film was at rest between its intermittent movements. I find that this blurring or the like is due largely to vibrations set up because of the high rate of speed at which the film is intermittently driven. I also find that to obtain satisfactory results in the analysis of motion generally, it is necessary to expose the film and take the pictures of the object at a rate several times 16 per second and at a rate substantially greater than 150 per second. If the pictures be only taken at a rate two or three times 16 per second, the difference in the speed of movement as taken and depicted is so slight that no satisfactory analysis of the movements is in general obtained. I find that satisfactory analysis may be obtained if the pictures are taken at a rate from 300 to 600 per second.

According to my invention, therefore, I expose a highly sensitive moving picture film strip in a moving picture camera to take a moving picture on the film of the object or part, movement of which is to be analyzed, the film being intermittently moved between exposures at a rate substantially greater than 150 movements or exposures per second while substantially preventing relative vibrations between the lens of the camera and the film at the point of exposure thereof, and of the camera with respect to the object or part being photographed, and I preferably thus expose the moving picture film while the object or part is constantly illuminated as distinguished from being periodically illuminated, as by flash-light, for example, produced by electric sparks or other electrical means. But according to my method in its preferred form the object or part being photographed may be substantially constantly illuminated either by ordinary sunlight or by relatively steady artificial light. In view of the fact that the time of exposure is extremely short I use a much larger stop than would ordinarily be employed if the pictures were taken at the rate of about 16 per second as is common. When a negative film is thus driven in a moving picture camera at a rate substantially greater than 150 consecutive pictures per second I find there is a tendency to set up considerable vibrations between the lens of the camera and the film at the point of exposure thereof and also of the camera with respect to the object or part being photographed and I, therefore, take steps to substantially prevent or eliminate such vibrations in order that the pictures will be regularly disposed on the film so that they may be projected without producing blurring or the like. For this purpose I may use a camera constructed in accordance with the description given in my co-pending application Ser. No. 381,175 filed on even date herewith, but it will be understood that any other construction in which such relative vibrations are eliminated may be used. In order that undue friction and heat may not be generated by the extremely rapid speed of the film through the camera, I lubricate the perforated edges of the film which engages the sprockets for driving the same with a lubricant and for this purpose I preferably coat the edges with one or more coats of paraffine which has been strained through bolting cloth to free the same from grit or dirt. Ordinarily after the negative, sensitive film has been thus exposed it will be developed in the usual manner and a corresponding positive thereof made and the latter then projected at the usual rate of about 16 exposures per second whereupon the movement of the object or part photographed is depicted with such slowness that it may be analyzed in great detail. The resulting film, either the developed negative or the positive therefrom, will have on it consecutive pictures of the object or part, movement of which is to be analyzed, taken at a high rate of speed of substantially more than 150 per second so as to show movements occurring in a small fraction of a sixteenth of a second or in substantially less than one one hundred and fiftieth of a second or less, the pictures being regularly disposed on the film so as to be projected at a rate of about 16 per second or slightly greater without blurring or the like. My improved method will be found useful for analyzing the motion of a great variety of objects and parts. I have obtained excellent results in the analyzing of motion of various parts of the human body in a great variety of actions and also in analyzing the movement of parts of machinery and of elements in physiological actions which are of great scientific value. It also makes possible the analysis of movement of various objects which are of great amusement value.

While I have described my improvements in great detail, I do not desire to be limited to such details since many changes may be made and the invention carried out with various forms of an apparatus without departing from the spirit and and scope of my invention in its broader aspects.

What I claim as new and desire to secure by Letters Patent is:

1. The method of analyzing motion which consists in exposing a sensitized film strip in a moving picture camera to take a moving picture on the film of the object or part, movement of which is to be analyzed, the said object or part being constantly illuminated and the film being intermittently moved between exposures at a rate substantially greater than 150 movements and exposures per second, while substantially preventing relative vibration between the lens of the camera and the film at the point of exposure thereof, and of the camera with respect to the object or part being photographed, then developing the negative film and making a corresponding positive thereof and projecting the latter at a rate of about 16 exposures per second.

2. In the method of analyzing motion the steps which consist in intermittently exposing and feeding a lubricated sensitive negative moving picture film in a moving picture camera at a rate to take thereon substantially more than 150 consecutive exposures per second, of the object or part, movement of which is to be analyzed, while substantially preventing relative vibration between the lens of the camera and the film at the point of exposure thereof, and of the camera with respect to the object or part being photographed and while the said object or part is constantly illuminated.

3. In the method of analyzing motion the steps which consist in intermittently exposing and feeding a sensitive negative moving picture film through a moving picture camera at a rate to take thereon substantially more than 150 exposures per second, of the object or part, movement of which is to be analyzed, while substantially preventing relative vibration between the lens of the camera and the film at the point of exposure thereof, and of the camera with respect to the object or part being photographed and while the said object or part is constantly illuminated, and consecutively projecting pictures so taken at the rate of about 16 per second.

4. In the method of analyzing motion the steps which consist in intermittently exposing and feeding a sensitive negative moving picture film in a moving picture camera at a rate to take thereon substantially more than 150 consecutive exposures per second, of the object or part, movement of which is to be analyzed while the said object or part is constantly illuminated.

5. In the method of analyzing motion, the steps which consist in intermittently feeding and exposing a sensitive moving picture film through a moving picture camera at a rate to take thereon substantially more than 150 exposures per second of the object or part, movement of which is to be analyzed, while substantially preventing relative vibration between the lens of the camera and the film at the point of exposure thereof, and of the camera with respect to the object or part being photographed and while the said object or part is constantly illuminated, then developing the negative film and making a positive thereof and projecting the latter at a less rate of exposure per second.

6. The improved moving picture film for analyzing motion, having thereon consecutive pictures of the object or part, movement of which is to be analyzed, taken while the object is substantially constantly illuminated and at a rate substantially greater than 150 per second, and with intermittent movement of the film at a rate substantially greater than 150 intermittent movements per second, the film thereby having substantially more than 150 different views of the object in a second, the pictures being regularly disposed on the film and capable of being projected at a rate of about 16 per second without blurring or the like.

Signed at New York, in the county of New York and State of New York this 11th day of May, A. D. 1920.

CHARLES P. WATSON.